US010210317B2

(12) United States Patent
Anderson et al.

(10) Patent No.: US 10,210,317 B2
(45) Date of Patent: Feb. 19, 2019

(54) MULTIPLE-POINT COGNITIVE IDENTITY CHALLENGE SYSTEM

(71) Applicant: International Business Machines Corporation, Armonk, NY (US)

(72) Inventors: Duncan S. Anderson, Sevenoaks (GB); Oliver C. W. Blodgett, New York, NY (US); Timothy Durniak, Poughkeepsie, NY (US); Mikaela R. Moore, New York, NY (US); Martin Schmid, Stare Hradiste (CZ)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 15/236,796

(22) Filed: Aug. 15, 2016

(65) Prior Publication Data

US 2018/0046785 A1  Feb. 15, 2018

(51) Int. Cl.
| | | |
|---|---|---|
| G06F 7/04 | (2006.01) | |
| H04L 9/32 | (2006.01) | |
| G06F 21/00 | (2013.01) | |
| G06F 21/31 | (2013.01) | |

(52) U.S. Cl.
CPC .................................. *G06F 21/31* (2013.01)

(58) Field of Classification Search
CPC ....................................................... G06F 21/31
USPC ...................... 726/18, 4–6, 26; 713/168, 182
See application file for complete search history.

(56) References Cited

U.S. PATENT DOCUMENTS

| | | |
|---|---|---|
| 5,878,385 A | 3/1999 | Bralich et al. |
| 6,126,306 A | 10/2000 | Ando |
| 6,658,377 B1 | 12/2003 | Anward et al. |
| 6,675,159 B1 | 1/2004 | Lin et al. |
| 7,434,087 B1 | 10/2008 | Singh |
| 8,234,195 B1 * | 7/2012 | Berhanu ............ G06Q 30/0201 705/35 |
| 8,275,803 B2 | 9/2012 | Brown et al. |

(Continued)

OTHER PUBLICATIONS

Copestake, Ann, "Implementing Typed Feature Structure Grammars", Book, CSLI Publications, CSLI lecture notes, vol. 110, Apr. 1, 2002, 233 pages. (A copy of this book will not be submitted at this time; A Copy of this book was provided to the USPTO on Feb. 4, 2016, Artifact No. 14874807ZA).

(Continued)

*Primary Examiner* — Aravind K Moorthy
(74) *Attorney, Agent, or Firm* — Francis Lammes; Stephen J. Walder, Jr.; William J. Stock (57) ABSTRACT

A mechanism is provided for verifying an identity of a user using dynamically generated questions based on transactions conducted by the user. Responsive to receiving a request to verify the identity of the user, one or more transaction based sources associated with the user are scanned for a set of transactions conducted by the user within a first predetermined time frame of a current time. A subset of transactions from the set of transactions are randomly selected as the basis for forming a set of questions to be used to verify the identity of the user. The set of questions are generated such that the user is required to identify one or more details about the subset of transactions in order to verify the user's identity. Responsive to the user correctly answering the one or more details about the subset of transactions, the user is authenticated.

20 Claims, 4 Drawing Sheets

(56) References Cited

U.S. PATENT DOCUMENTS

| | | | |
|---|---|---|---|
| 8,600,872 | B1* | 12/2013 | Yan .................. G06Q 40/02 705/35 |
| 8,745,698 | B1* | 6/2014 | Ashfield ............. H04L 63/08 726/4 |
| 2006/0080347 | A1 | 4/2006 | Potts et al. |
| 2006/0123421 | A1* | 6/2006 | Loboz ................ G06F 9/505 718/105 |
| 2007/0067293 | A1 | 3/2007 | Yu |
| 2007/0073533 | A1 | 3/2007 | Thione et al. |
| 2007/0136246 | A1 | 6/2007 | Stenchikova et al. |
| 2007/0245167 | A1 | 10/2007 | De La Cruz et al. |
| 2008/0254419 | A1 | 10/2008 | Cohen |
| 2009/0138405 | A1* | 5/2009 | Blessing ............. G06F 21/32 705/67 |
| 2009/0150718 | A1 | 6/2009 | Park et al. |
| 2009/0287678 | A1 | 11/2009 | Brown et al. |
| 2009/0319274 | A1 | 12/2009 | Gross |
| 2010/0229223 | A1* | 9/2010 | Shepard ............ G06F 21/31 726/5 |
| 2010/0234691 | A1 | 9/2010 | Iwano et al. |
| 2011/0029773 | A1* | 2/2011 | Effenberger ........ H04L 9/3271 713/168 |
| 2011/0066587 | A1 | 3/2011 | Ferrucci et al. |
| 2011/0125734 | A1 | 5/2011 | Duboue et al. |
| 2012/0254940 | A1* | 10/2012 | Raper ............. G06Q 20/4014 726/3 |
| 2013/0007055 | A1 | 1/2013 | Brown et al. |
| 2013/0018652 | A1 | 1/2013 | Ferrucci et al. |
| 2013/0046731 | A1 | 2/2013 | Ghosh et al. |
| 2013/0066886 | A1 | 3/2013 | Bagchi et al. |
| 2013/0166449 | A1* | 6/2013 | Moon ............... G06Q 20/405 705/44 |
| 2013/0263227 | A1 | 10/2013 | Gongaware et al. |
| 2013/0304749 | A1 | 11/2013 | Cooper |
| 2013/0339164 | A1* | 12/2013 | LoPresto ............ G07F 19/206 705/16 |
| 2013/0340056 | A1* | 12/2013 | Jung ................. H04L 63/08 726/5 |
| 2014/0040181 | A1 | 2/2014 | Kuznetsov |
| 2014/0136188 | A1 | 5/2014 | Wroczynski et al. |
| 2014/0304158 | A1 | 10/2014 | Basu et al. |
| 2015/0104764 | A1 | 4/2015 | Murray et al. |
| 2015/0128240 | A1 | 5/2015 | Richards et al. |
| 2015/0161375 | A1* | 6/2015 | Ghosh ............... G06F 21/36 726/7 |
| 2015/0172903 | A1* | 6/2015 | Sun ................. H04L 67/16 370/312 |
| 2015/0187359 | A1 | 7/2015 | Bhaskaran |
| 2015/0199400 | A1 | 7/2015 | Wu |
| 2016/0080355 | A1* | 3/2016 | Greenspan .......... G06F 21/51 726/7 |
| 2016/0092671 | A1* | 3/2016 | Andreeva ........... G06F 21/46 726/6 |
| 2016/0189151 | A1* | 6/2016 | He ................. G06Q 20/401 705/75 |
| 2017/0013012 | A1* | 1/2017 | Hansen ............. G06Q 20/382 |
| 2017/0126661 | A1* | 5/2017 | Brannon ........... H04L 63/0815 |
| 2017/0250968 | A1* | 8/2017 | Licht .............. H04L 63/08 |
| 2017/0289120 | A1* | 10/2017 | Kohli .............. H04L 63/08 |
| 2017/0344990 | A1* | 11/2017 | Kohli .............. G06Q 20/401 |
| 2018/0041503 | A1 | 2/2018 | Lindemann |
| 2018/0047025 | A1* | 2/2018 | Anderson ......... G06Q 20/40145 |

OTHER PUBLICATIONS

List of IBM Patents or Applications Treated as Related, Aug. 19, 2016, 2 pages.

Report under Section 17(5)(b) dated Apr. 24, 2015, Application No. GB1419051.6, 5 pages.

"Teaching Children to Read: An Evidence-Based Assessment of the Scientific Research Literature on Reading and Its Implications for Reading Instruction", National Reading Panel, Reports of the Subgroups, Apr. 2000, 449 pages.

"Tivoli Storage FlashCopy Manager Installation and User's Guide for AIX", IBM Corporation, Version 2.1, Program No. 5724-X94, Copyright International Business Machines Corporation 2001, 2009, 194 pages.

Ali, Husam et al., "Automation of Question Generation From Sentences", Proceedings of QG2010: The Third Workshop on Question Generation, The Tenth International Conference on Intelligent Tutoring Systems (ITS2010), Pittsburgh, Pennsylvania, Jun. 18, 2010, pp. 58-67.

Boyer, Kristy E. et al., "QG2010: The Third Workshop on Question Generation", The Tenth International Conference on Intelligent Tutoring Systems (ITS2010), Pittsburgh, Pennsylvania, Jun. 18, 2010, 2 pages.

Callmeier, Ulrich, "PET—a platform for experimentation with efficient HPSG processing techniques", Cambridge University Press, Natural Language Engineering, vol. 6, No. 1, Mar. 2000, pp. 99-107.

Copestake, Ann et al., "Minimal Recursion Semantics: An Introduction", Springer, Research on Language and Computation, vol. 3, Issues 2-3, Jul. 2005, pp. 281-332.

Dunning, Ted, "Accurate Methods for the Statistics of Surprise and Coincidence", MIT Press, Computational Linguistics, vol. 19, No. 1, Mar. 1993, pp. 61-74.

Flickinger, Dan et al., "On building a more efficient grammar by exploiting types", Cambridge University Press, Natural Language Engineering, Special Issue on Efficient Processing with HPSG: Methods, Systems, Evaluation, vol. 6, Part 1, Mar. 2000, pp. 15-28.

Heilman, Michael, "Automatic Factual Question Generation from Text", Carnegie Mellon University, Language Technologies Institute, School of Computer Science, Doctoral Thesis in the field of Language Technologies, CMU-LTI-11-004, Jan. 2011, 206 pages.

High, Rob, "The Era of Cognitive Systems: An Inside Look at IBM Watson and How it Works", IBM Corporation, Redbooks, Dec. 12, 2012, 16 pages.

Jang, Yong-IL et al., "An Extendible Hashing Based Recovery Method in a Shared-Nothing Spatial Database Cluster*", Computational Science and Its Applications, ICCSA 2006, International Conference, Proceedings, Part IV, Glasgow, UK, May 8-11, 2006, 10 pages.

Kiekintveld, Christopher et al., "Computing Optimal Randomized Resource Allocations for Massive Security Games", Proceedings of the 8th International Conference on Autonomous Agents and Multiagent Systems (AAMAS 2009), May 10, 2009, 8 pages.

Kipper, Karin et al., "A large-scale classification of English verbs", Springer Netherlands, Language Resources & Evaluation, vol. 42, No. 1, Mar. 2008, pp. 21-40.

Lawson, Susan et al., "Best Practices for DB2 on z/OS Backup and Recovery", BMC Software, www.db2expert.com and BMC Software, Jun. 2009, 96 pages.

Lindberg, David, "Automatic Question Generation From Text for Self-Directed Learning", Simon Fraser University, http://summit.sfu.ca/system/files/iritems1/12985/etd7872_DLindberg.pdf, Applied Sciences: School of Computing Science, Master of Science Thesis, Jun. 26, 2013, 81 pages.

Mannem, Prashanth et al., "Question Generation from Paragraphs at UPenn: QGSTEC System Description", Proceedings of QG2010: The Third Workshop on Question Generation, The Tenth International Conference on Intelligent Tutoring Systems (ITS2010), Pittsburgh, Pennsylvania, Jun. 18, 2010, pp. 84-91.

McCord, M.C. et al., "Deep parsing in Watson", IBM J. Res. & Dev. vol. 56 No. 3/4 Paper 3, May/Jul. 2012, pp. 3:1-3:15.

Miller, George A., "WordNet: A Lexical Database for English", Association for Computing Machinery, Communications of the ACM, vol. 38, No. 11, Nov. 1995, pp. 39-41.

Mostow, Jack et al., "Generating Instruction Automatically for the Reading Strategy of Self-Questioning", IOS Press, Proceeding of the 2009 conference on Artificial Intelligence in Education: Building Learning Systems that Care: From Knowledge Representation to Affective Modelling, Jul. 2009, pp. 465-472.

Pal, Santanu et al., "QGSTEC System Description—JUQGG: A Rule based approach", Proceedings of QG2010: The Third Work- (56) References Cited

OTHER PUBLICATIONS shop on Question Generation, The Tenth International Conference on Intelligent Tutoring Systems (ITS2010), Pittsburgh, Pennsylvania, Jun. 18, 2010, pp. 76-79.

Palmer, Martha et al., "The Proposition Bank: An Annotated Corpus of Semantic Roles", MIT Press, Computational Linguistics, vol. 31, No. 1, Mar. 2005, pp. 71-105.

Papineni, Kishore et al., "BLEU: a Method for Automatic Evaluation of Machine Translation", Association for Computational Linguistics, Proceedings of the 40th Annual Meeting of the Association for Computational Linguistics (ACL), Philadelphia, Pennsylvania, Jul. 2002, pp. 311-318.

Pita, James et al., "Deployed ARMOR Protection: The Application of a Game Theoretic Model for Security at the Los Angeles International Airport", Proceedings of the 7th Conference on Autonomous Agents and Multiagent Systems (AAMAS 2008), Industry and Applications Track, Berger, Burg, Nishiyama (eds.), Estoril, Portugal, May 12-16, 2008, 8 pages.

Pradhan, Sameer S. et al., "Support Vector Learning for Semantic Argument Classification", Machine Learning, 60(1-3), Sep. 2005, 30 pages.

Prager, John et al., "Answering What-is Questions by Virtual Annotation", Association for Computational Linguistics, Proceedings of the first international conference on Human language technology research (HLT '01), Stroudsburg, Pennsylvania, Mar. 2001, pp. 1-5.

Punyakanok, Vasin et al., "The Importance of Syntactic Parsing and Inference in Semantic Role Labeling", MIT Press, Computational Linguistics, vol. 34, No. 2, Jun. 2008, pp. 257-287.

Ratinov, Lev et al., "Design Challenges and Misconceptions in Named Entity Recognition", Association for Computational Linguistics, Proceedings of the Thirteenth Conference on Computational Natural Language Learning (CoNLL), Boulder, Colorado, Jun. 2009, pp. 147-155.

Recasens, Marta et al., "The Life and Death of Discourse Entities: Identifying Singleton Mentions", Association for Computational Linguistics, Proceedings of the NAACL-HLT, Atlanta, Georgia, Jun. 9-14, 2013, pp. 627-633.

Sag, Ivan A. et al., "Generating Questions with Deep Reversible Grammars", Proceedings of the First Workshop on the Question Generation Shared Task and Evaluation Challenge, Arlington, Virginia: NSF, Sep. 2008, 3 pages.

Varga, Andrea et al., "WLV: A Question Generation System for the QGSTEC 2010 Task B", Proceedings of QG2010: The Third Workshop on Question Generation, The Tenth International Conference on Intelligent Tutoring Systems (ITS2010), Pittsburgh, Pennsylvania, Jun. 18, 2010, pp. 80-83.

Yao, Xuchen, "Question Generation With Minimal Recursion Semantics", University of Groningen & Saarland University, http://cs.jhu.edu/~xuchen/paper/Yao2010Master.pdf, European Masters Program in Language and Communication Technologies, Master Thesis, Aug. 2010, 81 pages.

Yao, Xuchen et al., "Semantics-based Question Generation and Implementation", Dialogue and Discourse, Special Issue on Question Generation, vol. 3, No. 2, Mar. 2012, pp. 11-42.

Yuan, Michael J., "Watson and healthcare, How natural language processing and semantic search could revolutionize clinical decision support", IBM developerWorks, IBM Corporation, Apr. 12, 2011, 14 pages.

Cole, Bryan, "Dynamic KBA—The Best Security Questions", Jun. 19, 2014, www.identropy.com, 5 pages.

\* cited by examiner

MULTIPLE-POINT COGNITIVE IDENTITY CHALLENGE SYSTEM

BACKGROUND

The present application relates generally to an improved data processing apparatus and method and more specifically to mechanisms for a multiple-point cognitive identity challenge system.

Fraud is an ever prevalent issue dealt with by users of computing networks, such as the Internet, because these computing networks are inundated with information from various structured and unstructured sources. Furthermore, the use of digital engagement channels by institutions increases the potential that a fraudster can pretend to be someone else, since all a fraudster needs to do is research the digital engagement channel, the line of identity validation questioning used, and gather the correct answers ahead of time. The weakness is that "who are you" validation questions tend to get stale and thus, known by fraudsters. That is, information requested for identity validation are increasingly easy to find out by other means, e.g. mother's maiden name, where the user lives, who lives with the user.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for verifying an identity of a user using dynamically generated questions based on transactions conducted by the user. The illustrative embodiments receive a request to verify the identity of the user. The illustrative embodiments scan one or more transaction based sources associated with the user for a set of transactions conducted by the user within a first predetermined time frame of a current time. The illustrative embodiments randomly select a subset of transactions from the set of transactions as the basis for forming a set of questions to be used to verify the identity of the user. The illustrative embodiments generate the set of questions such that the user is required to identify one or more details about the subset of transactions in order to verify the user's identity. The illustrative embodiments present the set of questions to the user. The illustrative embodiments authenticate the user in response to the user correctly answering the one or more details about the subset of transactions.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for a multiple-point cognitive identity challenge system. Currently, a common verification mechanism for verifying a user's identity is to request answers to a set of pre-determined questions, for example: "What is your mother's maiden name?", "What city were you born in?", or "What was the name of your childhood pet?". However, if the questions are from a limited set, then the verification mechanism has security vulnerabilities. One possible solution would be to generate dynamic questions from information sources containing a history of transactions related to the user. For example, providing a list of recent transactions from an account record and asking the user to identify which transactions are true or false. However, if the questions being asked are based on a set of formal rules and the information sources are known, then this verification mechanism also has security vulnerabilities.

Thus, the use of digital engagement channels by verification institutions increase the potential that a fraudster may pretend to be someone else, since all the fraudster needs to do is research the digital engagement channel, the line of identity validation questioning used by the digital engagement channel, and gather the correct answers to the verification mechanisms ahead of time. That is, the weakness of the "who are you" validation questions are stale and may easily be identified by fraudsters, for example, the maiden name of the user's mother from an ancestral web page or birth records, where the user lives from appraisal district records, who lives with the user from census information. Additionally, these verification mechanisms may phrase verification questions that may alter the result, for example, the sentence structure or word choice of the questions may not suit the education level of the person being asked. Further, the answers provided to the verification mechanism may require an exact match, such as correct spelling, word order, or the like.

Thus, the illustrative embodiments provide a verification mechanism, referred to as a Digital Virtual Assistant (DVA), that verifies a user's identity by generating questions based on changing information sources. In the illustrative embodiments, the verification mechanism randomly generates the verification questions based on question strategy (i.e. a game-theory model) and risk level. That is, the verification mechanism applies game theory to randomize not only the verification questions based on data source, question sequences, or the like, but also the scoring approach of the answers to the verification questions based on how well the answer has to match, use of biometrics, voice analysis, or the like. Therefore, using multi-point cognitive identify challenge verification mechanism of the illustrative embodiments, a determination is made as to "who" is being questioned, extracting verification question information both from public and private sources, generating phrasing for the verification questions, and determining an answer match to each verification question within a predetermined threshold.

With regard to identifying "who" is being questioned, the verification mechanism receives a request to verify the identity of the user that is based on at least a username and password of the user. However, since the username and password may only be a first level of security and the request is for a second level of security, the verification mechanism scans one or more transaction based sources associated with the user identified by the username and password for a set of transactions conducted by the user within a first predetermined time frame of the current time. In the illustrative embodiments, the one or more transaction based sources are unstructured data streams, such as a bank account, credit card account, health care records, social media account, loyalty program, or the like, associated with the user. The verification mechanism randomly selects a subset of transactions from the set of transactions as the basis for forming a set of questions to be used to verify the identity of the user. The random selection of the subset of transactions from the set of transactions is based on a game-theory model.

That is, the verification mechanism generates a formal model of the problem, i.e. verification of the user using the subset of transactions, and determines an optimal strategy within the formal model. For example, utilizing the subset of transactions, the verification mechanism generates factual questions, yes/no questions, multiple choice questions, or the like, that includes both accurate information and inaccurate information through a sequential dialog with the user. While questions that are yes/no or multiple choice have only one correct answer, factual questions may vary in accuracy. That is, as one example, if the formulated question is "How much was your hotel bill last night?" when the bill was actually $163.45, the verification mechanism may consider an answer of $160.00 to be very accurate. Thus, the verification mechanism may utilize a percentage of difference between an answer provided by a user and the correct answer.

Additionally, the user's responses to the questions may be utilized to formulate other questions. That is, in the game theory model, each action taken by the user may change the next action that the user may take. Thus, the user's answer to one question may change how the verification mechanism presents the next question. For example, if the user's answer to the formulated question is "How much does the hotel you're staying in cost per night?" is not within the predetermined threshold set by the verification mechanism, the verification mechanism may present the next question based on the previous question. For example, the next question may be a request to provide an image of the hotel room you're staying in. The verification mechanism may then compare the image provided by the user to a set of preexisting images for that hotel. Thus, the formalism of questions may be adjusted to reflect the questions being asked and the verification mechanism generating a set of questions such that the user is required to identify one or more details about one or more of the subset of transactions in order to verify the user's identity.

For each of the questions that are asked, the verification mechanism may also require that the answers be provided within a predetermined time frame of the current time. That is, each answer to each of the set of questions may have an associated biometric requirement or time input value that is required to be met for the answer to be considered valid. The associated time input value may be preset for all answers or may be a predetermined time frame from the current time frame that may be automatically increased responsive to the number of transactions within the predetermined time frame falling below a required transaction threshold. That is, if the set of transactions identified within a predetermined time frame of the current time is less than a predetermined number, i.e. there has only been three transactions over the last five days, and the verification mechanism requires a minimum of ten transaction, then the other five identified transaction that are identified will be older than five days. Thus, the verification mechanism may increase the time required for the user to answer questions pertaining to the transactions that are older than five days because the information may not be as fresh in the user's mind.

Still further, if the questions are being answered verbally rather than being entered into a computing device, the verification mechanism may also utilize voice analysis to identify a geographic identity, gender identity, hesitation level, or the like associated with the caller. That is, if the user has a recorded voice sample, the verification mechanism may compare the user's voice to the voice sample in order to identify the user. However, if there is no voice sample and the verification mechanism determines that the user is from the northeastern United States, the verification mechanism may determine whether the accent of the user matches accents from that northeastern region of the United States, whether word/phrase choices by the user match regional norms, or the like. Still further, the verification mechanism may look for hesitation fillers in the responses from the user, i.e. "um," "er," "ah," or the like, above a predetermined number, and/or pause length above a predetermined length. Even further, the verification mechanism may determine whether multiple voices are being detected indicating a potential for a fraudster directing the user being defrauded. Additionally, in the instance of multiple voices, the verification mechanism may separate the multiple voices and identify one of the voices using voice match analysis as a known fraudster or, in the case of just a single user, the verification mechanism may, using voice match analysis, identify the single user as a known fraudster.

Thus, based on the user's answers to the set of questions generated from the subset of transactions as well as the analysis of the answers, the verification mechanism may either authenticate the user and allow access or deny access to the user. The verification mechanism may have different levels with regard to authenticating the user, for example, requiring that all of the set of questions are required to be answered before a determination as to whether the user is authentic is made or, if the set of questions is ten and the user has correctly answered the first eight, then the user may be authenticated before the user answers all ten questions.

Therefore, the illustrative embodiments provide a verification mechanism that verifies a user's identity by generating questions based on changing information sources. The verification mechanism extracting verification question information both from public and private sources, randomly generates the verification questions based on question strategy (i.e. a game-theory model) and risk level, generates phrasing for the verification questions, and determines an answer match to each verification question within a predetermined threshold.

Having given an overview of operations in accordance with one illustrative embodiment, before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
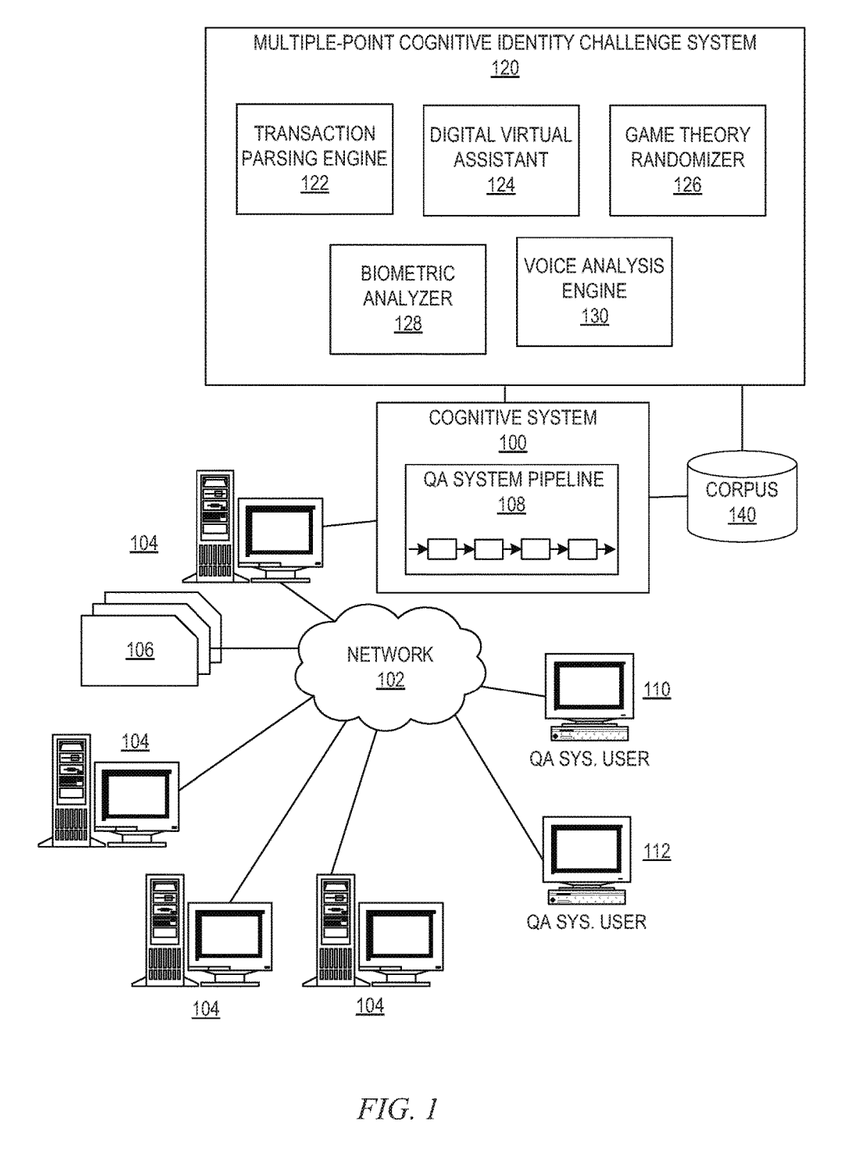
FIG. 1 depicts a schematic diagram of one illustrative embodiment of a question/answer creation (QA) system in a computer network.
Figure 2:
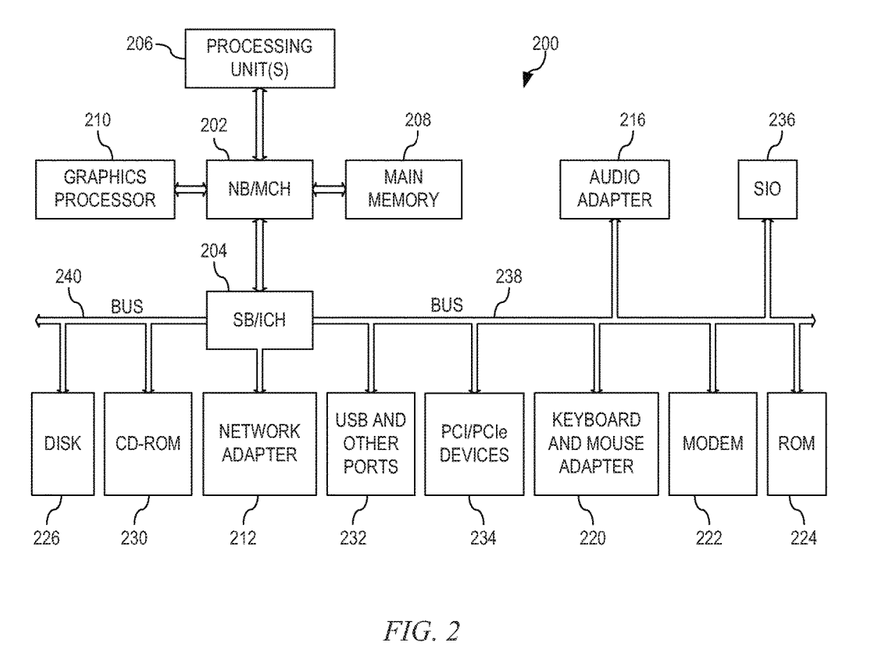
FIG. 2 is a block diagram of an example data processing system in which aspects of the illustrative embodiments are implemented.
Figure 3:
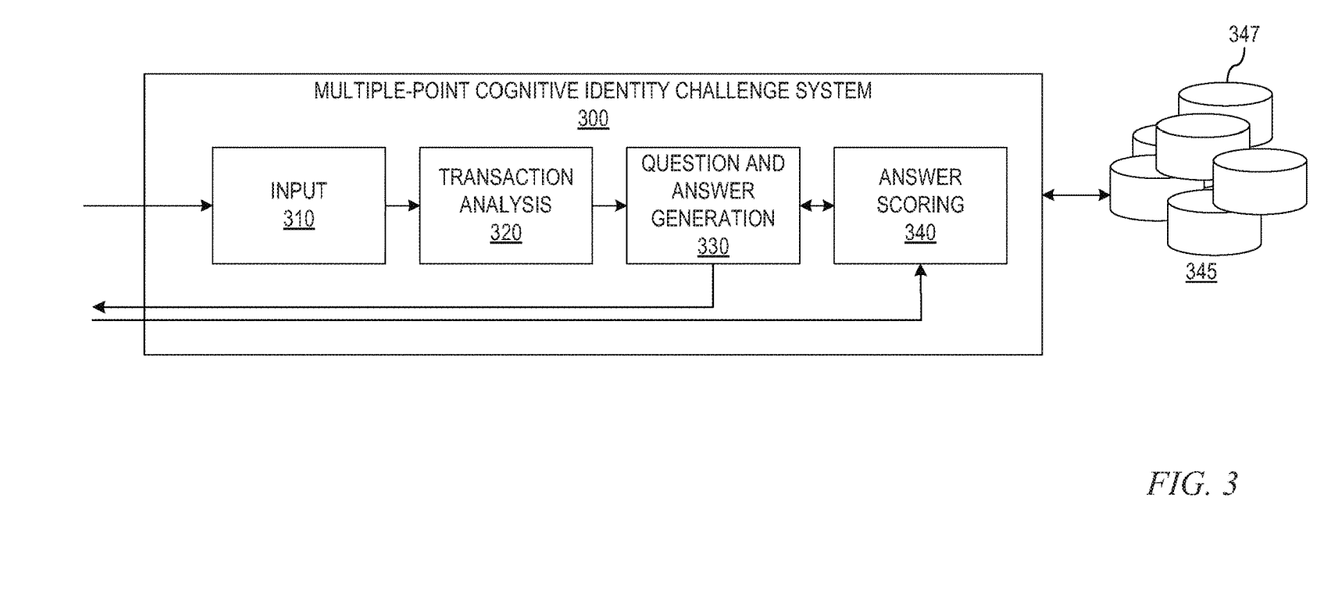
FIG. 3 illustrates a system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of these QA mechanisms of the cognitive system with regard to verifying an identity of a user using dynamically generated questions based on transactions conducted by the user.

Thus, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding
  Ingest and process vast amounts of structured and unstructured data
  Generate and evaluate hypothesis
  Weigh and evaluate responses that are based only on relevant evidence
  Provide situation-specific advice, insights, and guidance
  Improve knowledge and learn with each iteration and interaction through machine learning processes
  Enable decision making at the point of impact (contextual guidance)
  Scale in proportion to the task
  Extend and magnify human expertise and cognition
  Identify resonating, human-like attributes and traits from natural language
  Deduce various language specific or agnostic attributes from natural language
  High degree of relevant recollection from data points (images, text, voice) (memorization and recall)
  Predict and sense with situational awareness that mimic human cognition based on experiences
  Answer questions based on natural language and specific evidence In one aspect, cognitive systems provide mechanisms for answering questions posed to these cognitive systems using a Question Answering pipeline or system (QA system). In another aspect, the QA pipeline may generate questions based on a set of known information for use in obtaining answers from a user in order to validate the user. The QA pipeline or system is an artificial intelligence application executing on data processing hardware pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. The documents may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and provide input to the cognitive system 100 that validates or invalidates the identity of the user using answers in the content in the corpus of data 106. In one embodiment, the questions are formed using natural language. The cognitive system 100 parses and generates questions via a QA pipeline 108, and analyzes answers to the questions.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware, for implementing a multiple-point cognitive identity challenge system 120. The operation of the multiple-point cognitive identity challenge system 120 may be initiated in response to receiving an attempted login from a user that requires further verification. Utilizing the username and password from the login, transaction parsing engine 122 scans corpus 140, which are unstructured data streams of transaction based sources such as a bank account, credit card account, health care records, social media account, loyalty program, or the like, associated with the user for a set of transactions conducted by the user within a first predetermined time frame of the current time. Transaction parsing engine 122 attempts to identify a predetermined number of transactions conducted by the user. However, if the predetermined number of transactions does not exist within the first predetermined time frame of the current time, the time frame from the current time may be increased to a second time frame so that the predetermined number of transactions is identified.

Once transaction parsing engine 122 identifies the predetermined number of transactions, Digital Virtual Assistant (DVA) 124, which is a verification mechanism, randomly selects a subset of transactions from the set of transactions as the basis for forming a set of questions to be used to verify the identity of the user. The random selection of the subset of transactions from the set of transactions is based on a game-theory model. Using the selected subset of transactions, DVA 124 generates factual questions, yes/no questions, multiple choice questions, or the like, that includes both accurate information and inaccurate information through a sequential dialog with the user utilizing game theory randomizer 126. That is, in the game theory model, each action taken by the user may change the next action that the user may take. Thus, the user's answer to one question may change how DVA 124 presents the next question. For example, if the user's answer to the formulated question is "How much does the hotel you're staying in cost per night?" is not within the predetermined threshold set by DVA 124, DVA 124 may present the next question based on the previous question. For example, the next question may be a request to provide an image of the hotel room you're staying in. DVA 124 may then compare the image provided by the user to a set of preexisting images for that hotel. Thus, DVA 124 may adjust the formalism of questions to reflect the questions being asked and generate a set of questions such that the user is required to identify one or more details about one or more of the subset of transactions in order to verify the user's identity. Furthermore, DVA 124 may utilize a percentage of difference between an answer provided by a user and the correct answer. For example, if the formulated question is "How much was your hotel bill last night?" when the bill was actually $163.45, DVA 124 may consider an answer of $160.00 to be very accurate.

For each of the questions that are asked, DVA 124 may also require that the answers be provided within a predetermined time frame of the current time. Thus, for each question there is an associated time frame that is monitored by biometric analyzer 128 which monitors the speed of the answer whether it is typed or verbally responded to. The associated time input value may be preset for all answers or may be a predetermined time frame from the current time frame that may be automatically increased responsive to the number of transactions within the predetermined time frame falling below a required transaction threshold. That is, if the set of transactions identified within a predetermined time frame of the current time is less than a predetermined number, i.e. there has only been three transactions over the last five days, and the verification mechanism requires a minimum often transactions, then the other five identified transactions that are identified will be older than five days. Thus, DVA 124 may increase the time required for the user to answer questions pertaining to the transactions that are older than five days because the information may not be as fresh in the user's mind.

Sill further, if the questions are being answered verbally rather than being entered into a computing device, DVA 124 may also employ voice analysis engine 130 to identify a geographic identity, gender identity, hesitation level, or the like associated with the caller. That is, if the user has a recorded voice sample, voice analysis engine 130 may compare the user's voice to the voice sample in order to identify the user. However, if there is no voice sample and voice analysis engine 130 determines that the user is from the northeastern United States, voice analysis engine 130 may determine whether the accent of the user matches accents from that northeastern region of the United States. Still further, voice analysis engine 130 may look for hesitation fillers in the responses from the user, i.e. "um," "er," "ah," or the like, and/or pause length.

Thus, based on the user's answers to the set of questions generated from the subset of transactions as well as the analysis of the answers, DVA 124 may either authenticate the user and allow access or deny access to the user. DVA 124 may have different levels with regard to authenticating the user, for example, requiring that all of the set of questions are required to be answered before a determination as to whether the user is authentic or, if the set of questions is ten and the user has correctly answered the first eight, then the user may be authenticated before the user answers all ten questions.

Thus, the illustrative embodiments provide an intelligent cognitive system that verifies a user's identity by generating questions based on changing information sources. In the illustrative embodiments, the intelligent cognitive system randomly generates the verification questions based on question strategy (i.e. a game-theory model) and risk level by applying game theory to randomize not only the verification questions based on data source, question sequences, or the like, but also the scoring approach of the answers to the verification questions based on how well the answer has to match, use of biometrics, voice analysis, or the like. Therefore, the intelligent cognitive system provides for a determination as to "who" is being questioned, extracting verification question information both from public and private sources, generating phrasing for the verification questions, and determining an answer match to each verification question within a predetermined threshold.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® cServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a system pipeline, of a cognitive system, for processing an input question in accordance with one illustrative embodiment. The system pipeline of FIG. 3 may be implemented, for example, as pipeline 108 of multiple-point cognitive identity challenge system 120 in FIG. 1. It should be appreciated that the stages of the pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The pipeline of FIG. 3 is augmented, for example, in one or more of the stages to implement the improved mechanism of the illustrative embodiments described hereafter, additional stages may be provided to implement the improved mechanism, or separate logic from the multi-point cognitive identity challenge system pipeline 300 may be provided for interfacing with the multi-point cognitive identity challenge system pipeline 300 and implementing the improved functionality and operations of the illustrative embodiments.

As shown in FIG. 3, the multi-point cognitive identity challenge system pipeline 300 comprises a plurality of stages 310-340 through which the cognitive system and the multiple-point cognitive identity challenge system pipeline 300 operate to analyze an input question and generate a set of questions. In an initial input stage 310, the multi-point cognitive identity challenge system pipeline 300 receives a request for verification of a user. That is, a user inputs a user name and password, via a user interface, and access to the system is requested The next stage of the multi-point cognitive identity challenge system pipeline 300, i.e. the transaction analysis stage 320, performs a parsing to extract transactions based on, e.g., names, dates, or any of a plethora of other defined topics, associated with the user. The transactions are identified from a corpora of data/information 345 using queries that are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Thus, the queries are applied to one or more unstructured data streams of transaction based sources such as a bank account, credit card account, health care records, social media account, loyalty program, or the like, associated with the user, e.g., the corpus of data 106 in FIG. 1. Transaction analysis stage 320 attempts to identify a predetermined number of transactions conducted by the user. However, if the predetermined number of transactions does not exist within the first predetermined time frame of the current time, the time frame from the current time may be increased to a second time frame so that the predetermined number of transactions is identified.

The results of the parsing of the unstructured data streams provide data/information utilized at the question and answer generation stage 330 to generate potential questions and answers to the questions that will be used for comparison based on the subset of transactions requiring answers from the user. Once transaction analysis stage 320 identifies the predetermined number of transactions, question and answer generation stage 330 randomly selects a subset of transactions from the set of transactions as the basis for forming a set of questions as well as comparison answers to the set of questions to be used to verify the identity of the user. The random selection of the subset of transactions from the set of transactions is based on a game-theory model. Using the subset of transactions that are identified, question and answer generation stage 330 generates factual questions, yes/no questions, multiple choice questions, or the like, that includes both accurate information and inaccurate information through a sequential dialog with the user utilizing game theory randomization. That is, in a game theory model, each action taken by the user may change the next action that the user may take. Thus, the user's answer to one question may change how question and answer generation stage 330 presents the next question. The set of questions and comparison answers may be generated in real time and only utilized for the duration in which the verification of the user is taking place or, so as to not overtask the unstructured data streams, the set of questions and comparison answers generated during one session may be stored in a cache for some predetermined period of time, such as an hour, a few hours a day, or the like, for instances where a user may be attempting multiple verifications over a given time period.

The answers provided by the user and the comparison answers generated with the set of questions are utilized in an answer scoring stage 340 using percentages, predetermined thresholds, ranges, or the like, to determine how well the user's provided answer coincides with a known actual answer. This analysis is fed back to question and answer generation stage 330 for use in presenting the next question based on the previous question.

Additionally, for each of the questions that are asked, answer scoring stage 340 may also require that the answers be provided within a predetermined time frame of the current time using a biometric analyzer that monitors the speed of the answer whether it is typed or verbally responded to. The associated time input value may be preset for all answers or may be a predetermined time frame from the current time frame that may be automatically increased responsive to the number of transactions within the predetermined time frame falling below a required transaction threshold. That is, if the set of transactions identified within a predetermined time frame of the current time is less than a predetermined number, i.e. there has only been three transactions over the last five days, and the verification mechanism requires a minimum often transactions, then the other five identified transactions that are identified will be older than five days. Thus, multiple-point cognitive identity challenge system pipeline 300 may increase the time required for the user to answer questions pertaining to the transactions that are older than five days because the information may not be as fresh in the user's mind.

Sill further, if the questions are being answered verbally rather than being entered into a computing device, answer scoring stage 340 may also employ voice analysis to identify a geographic identity, gender identity, hesitation level, or the like associated with the caller. That is, if the user has a recorded voice sample, answer scoring stage 340 may compare the user's voice to the voice sample in order to identify the user. However, if there is no voice sample and the voice analysis determines that the user is from the northeastern United States, answer scoring stage 340 may determine whether the accent of the user matches accents from that northeastern region of the United States. Still further, the voice analysis may look for hesitation fillers in the responses from the user, i.e. "um," "er," "ah," or the like, and/or pause length.

Thus, based on the user's answers to the set of questions generated from the subset of transactions in question and answer generation stage 330 as well as the analysis of the answers in answer scoring stage 340, multiple-point cognitive identity challenge system pipeline 300 may either authenticate the user and allow access or deny access to the user as well as, if access is denied, transferring the users session or call to a company representative. Multiple-point cognitive identity challenge system pipeline 300 may have different levels with regard to authenticating the user, for example, requiring that all of the set of questions are required to be answered before a determination as to whether the user is authentic or, if the set of questions is ten and the user has correctly answered the first eight, then the user may be authenticated before the user answers all ten questions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
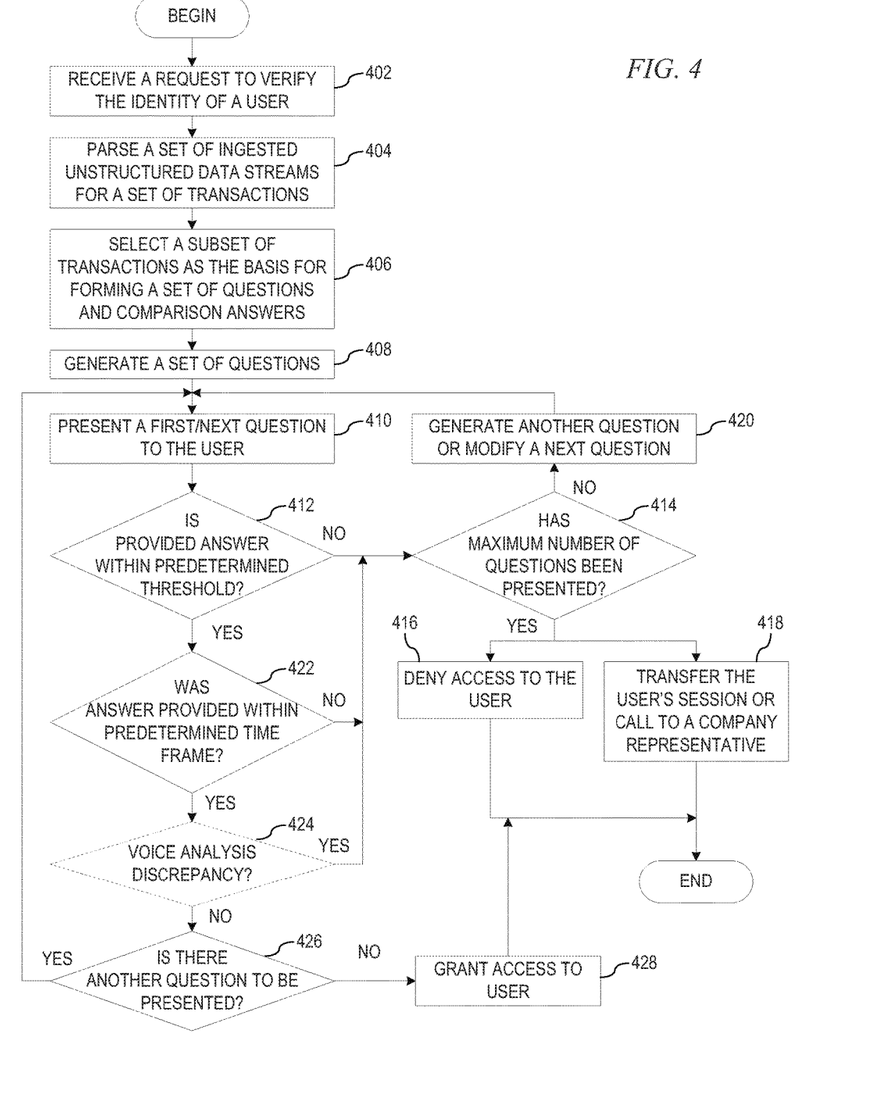
FIG. 4 is a flowchart outlining an example operation for verifying a user's identity by generating questions based on changing information sources in accordance with one illustrative embodiment.

FIG. 4 is a flowchart outlining an example operation for verifying a user's identity by generating questions based on changing information sources in accordance with one illustrative embodiment. For purposes of the operation outlined in FIG. 4, it is assumed that a corpus of unstructured data streams, such as a bank account, credit card account, health care records, social media account, loyalty program, or the like, associated with the user have already been ingested by the pipeline in which the multiple-point cognitive identity challenge system exists.

As the operation begins, the multiple-point cognitive identity challenge system receives a request to verify the identity of a user logging into an online system requiring subsequent user verification (step 402). The multiple-point cognitive identity challenge system parses a set of ingested unstructured data streams that are transaction based sources such as a bank account, credit card account, health care records, social media account, loyalty program, or the like, in order to identify a set of transactions conducted by the user (step 404). Once the multiple-point cognitive identity challenge system identifies the set of transactions, the multiple-point cognitive identity challenge system randomly selects a subset of transactions from the set of transactions as the basis for forming a set of questions to be used to verify the identity of the user (step 406). The random selection of the subset of transactions from the set of transactions is based on a game-theory model.

Using the identified subset of transactions from the unstructured data streams, the multiple-point cognitive identity challenge system generates a set of questions such as factual questions, yes/no questions, multiple choice questions, or the like, as well as comparison answers to the set of questions that include both accurate information and inaccurate information through a sequential dialog with the user utilizing game theory randomization (step 408). The multiple-point cognitive identity challenge system presents a first/next question of the set of questions to the user (step 410). For each of the set of questions, the multiple-point cognitive identity challenge system determines whether the provided answer is within a predetermined threshold, percentage, range, or the like, of the generated comparison answer to that question (step 412). If at step 412 the provided answer is not within the predetermined threshold, percentage, range, or the like, of the generated comparison answer to that question, the multiple-point cognitive identity challenge system determines whether a maximum number of questions have been presented (step 414). If at step 414 the maximum number of questions has already been presented, then the multiple-point cognitive identity challenge system denies access to the user (step 416) and/or transfers the users session or call to a company representative (418), with the operation ending thereafter.

If at step 414 the maximum number of questions has not been presented, the multiple-point cognitive identity challenge system may generate another question to add to the set of questions or modify a next question in the set of questions (step 420), with the operation retuning to step 410. If at step 412 the provided answer is within the predetermined threshold, percentage, range, or the like, the multiple-point cognitive identity challenge system determines whether the answer was provided within a predetermined time frame (step 422). If at step 422 the answer was not within the predetermined time frame, the operation proceeds to step 414. If at step 422 the answer was provided within the predetermined time frame, the multiple-point cognitive identity challenge system optionally determines whether voice analysis of the answer indicates a geographic identity discrepancy, gender identity discrepancy, hesitation level discrepancy, or the like associated with the caller (step 424). If at step 424 voice analysis indicates a discrepancy, then the operation proceeds to step 414. If at step 424 voice analysis fails to indicate a discrepancy, the multiple-point cognitive identity challenge system determines whether there is a next question to be presented (step 426). If at step 426 there is another question, the operation returns to step 410. If at step 426 there is no other question, the user is granted access (step 428), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for verifying a user's identity by generating questions based on changing information sources. The mechanisms randomly generate the verification questions based on question strategy (i.e. a game-theory model) and risk level. That is, the mechanisms apply game theory to randomize not only the verification questions based on data source, question sequences, or the like, but also the scoring approach of the answers to the verification questions based on how well the answer has to match, use of biometrics, voice analysis, or the like. Therefore, using multi-point cognitive identify challenge verification mechanism of the illustrative embodiments, a determination is made as to "who" is being questioned, extracting verification question information both from public and private sources, generating phrasing for the verification questions, and determining an answer match to each verification question within a predetermined threshold.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for verifying an identity of a user using dynamically generated questions based on transactions conducted by the user, the method comprising:

receiving a request to verify the identity of the user;

scanning one or more transaction based sources associated with the user for a set of transactions conducted by the user within a first predetermined time frame of a current time;

randomly selecting a subset of transactions from the set of transactions as the basis for forming a set of questions to be used to verify the identity of the user;

generating the set of questions such that the user is required to identify one or more details about the subset of transactions in order to verify the user's identity, wherein the random selection of the subset of transactions used to generate the set of questions are such that an answer to a question in the set of questions presented and answered by the user changes a next question in the set of questions to be presented to the user;

presenting the set of questions to the user; and responsive to the user correctly answering the one or more details about the subset of transactions, authenticating the user.

2. The method of claim 1, wherein the predetermined time frame from the current time frame may be automatically increased responsive to the number of transactions within the predetermined time frame falling below a required transaction threshold.

3. The method of claim 1, wherein the set of transactions conducted by the user are identified from at least one unstructured data stream.

4. The method of claim 1, wherein each answer to each question in the set of questions has an associated time input value that is required to be met for the answer to be considered valid.

5. The method of claim 1, wherein one question from the set of questions is a request for an image to be submitted to be compared to a preexisting image and wherein the image to be submitted is required to be taken within a second predetermined time frame of the current time.

6. The method of claim 1, wherein all of the set of questions are required to be answered before a determination as to whether the user is authentic is made.

7. The method of claim 1, wherein each answer to each question in the set of questions may have at least one of a percentage, predetermined threshold, or range from the actual answer for the answer to be considered correct.

8. A computer program product comprising a computer readable storage medium having a computer readable program stored therein, wherein the computer readable program, when executed on a computing device, causes the computing device to:
receive a request to verify the identity of a user,
scan one or more transaction based sources associated with the user for a set of transactions conducted by the user within a first predetermined time frame of a current time;
randomly select a subset of transactions from the set of transactions as the basis for forming a set of questions to be used to verify the identity of the user,
generate the set of questions such that the user is required to identify one or more details about the subset of transactions in order to verify the user's identity, wherein the random selection of the subset of transactions used to generate the set of questions are such that an answer to a question in the set of questions presented and answered by the user changes a next question in the set of questions to be presented to the user;
present the set of questions to the user, and
responsive to the user correctly answering the one or more details about the subset of transactions, authenticate the user.

9. The computer program product of claim 8, wherein the predetermined time frame from the current time frame may be automatically increased responsive to the number of transactions within the predetermined time frame falling below a required transaction threshold.

10. The computer program product of claim 8, wherein the set of transactions conducted by the user are identified from at least one unstructured data stream.

11. The computer program product of claim 8, wherein each answer to each question in the set of questions has an associated time input value that is required to be met for the answer to be considered valid.

12. The computer program product of claim 8, wherein one question from the set of questions is a request for an image to be submitted to be compared to a preexisting image and wherein the image to be submitted is required to be taken within a second predetermined time frame of the current time.

13. The computer program product of claim 8, wherein all of the set of questions are required to be answered before a determination as to whether the user is authentic is made.

14. The computer program product of claim 8, wherein each answer to each question in the set of questions may have at least one of a percentage, predetermined threshold, or range from the actual answer for the answer to be considered correct.

15. An apparatus comprising:
a processor; and
a memory coupled to the processor, wherein the memory comprises instructions which, when executed by the processor, cause the processor to:
receive a request to verify the identity of a user;
scan one or more transaction based sources associated with the user for a set of transactions conducted by the user within a first predetermined time frame of a current time;
randomly select a subset of transactions from the set of transactions as the basis for forming a set of questions to be used to verify the identity of the user;
generate the set of questions such that the user is required to identify one or more details about the subset of transactions in order to verify the user's identity, wherein the random selection of the subset of transactions used to generate the set of questions are such that an answer to a question in the set of questions presented and answered by the user changes a next question in the set of questions to be presented to the user;
present the set of questions to the user; and
responsive to the user correctly answering the one or more details about the subset of transactions, authenticate the user.

16. The apparatus of claim 15, wherein the predetermined time frame from the current time frame may be automatically increased responsive to the number of transactions within the predetermined time frame falling below a required transaction threshold.

17. The apparatus of claim 15, wherein the set of transactions conducted by the user are identified from at least one unstructured data stream.

18. The apparatus of claim 15, wherein each answer to each question in the set of questions has an associated time input value that is required to be met for the answer to be considered valid.

19. The apparatus of claim 15, wherein one question from the set of questions is a request for an image to be submitted to be compared to a preexisting image and wherein the image to be submitted is required to be taken within a second predetermined time frame of the current time.

20. The apparatus of claim 15, wherein all of the set of questions are required to be answered before a determination as to whether the user is authentic is made.

* * * * *